(12) United States Patent
Nokuo et al.

(10) Patent No.: US 10,184,606 B2
(45) Date of Patent: Jan. 22, 2019

(54) CAMERA, STAND, AND CAMERA UNIT HAVING CAMERA AND STAND

(71) Applicant: Sony Interactive Entertainment Inc., Tokyo (JP)

(72) Inventors: Taichi Nokuo, Tokyo (JP); Katsuhisa Tadano, Tokyo (JP); Kenji Kawashima, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/642,541

(22) Filed: Jul. 6, 2017

(65) Prior Publication Data

US 2018/0017204 A1 Jan. 18, 2018

(30) Foreign Application Priority Data

Jul. 13, 2016 (JP) .................................. 2016-138304

(51) Int. Cl.
*F16M 11/10* (2006.01)
*G03B 17/02* (2006.01)
(Continued)

(52) U.S. Cl.
CPC ........... *F16M 11/10* (2013.01); *F16M 11/041* (2013.01); *G03B 17/02* (2013.01);
(Continued)

(58) Field of Classification Search
CPC .. F16M 11/10; F16M 11/041; F16M 2200/02; H04N 5/2252
(Continued)

(56) References Cited

U.S. PATENT DOCUMENTS 9,835,933 B2 12/2017 Araki
2007/0177051 A1* 8/2007 Hsiao ................... H04N 5/2252
348/373
(Continued)

FOREIGN PATENT DOCUMENTS

EP 1113408 A1 7/2001
JP 2000092364 A 3/2000
(Continued)

OTHER PUBLICATIONS

Office Action for corresponding JP Application No. 2016138304, 13 pages, dated Apr. 24, 2018.
(Continued)

*Primary Examiner* — Lin Ye
*Assistant Examiner* — Chan T Nguyen
(74) *Attorney, Agent, or Firm* — Matthew B. Dernier, Esq.

(57) ABSTRACT

Disclosed herein is a camera including a light receiving section and a camera body incorporating the light receiving section. An outside surface of the camera body has, at least on a portion thereof, a curve surface curving around a rotation centerline extending along a left-right direction, and the curve surface is formed at least at portions positioned opposite to each other around the rotation centerline when the camera body is seen in the left-right direction. Also disclosed herein is a stand including a camera holding section configured to hold the outside of the camera. The camera holding section is formed so as to enclose the outside surface of the camera at an angle of at least 180 degrees when seen in the left-right direction, and the camera holding section has an inside surface formed so as to make the camera rotatable around the rotation centerline.

14 Claims, 7 Drawing Sheets

(51) Int. Cl.
*F16M 11/04* (2006.01)
*H04N 5/225* (2006.01)
*G03B 17/56* (2006.01)
*G06F 1/16* (2006.01)

(52) U.S. Cl.
CPC ......... *G03B 17/561* (2013.01); *G06F 1/1686* (2013.01); *H04N 5/2252* (2013.01); *F16M 2200/02* (2013.01)

(58) Field of Classification Search
USPC .................................................. 348/373–375
See application file for complete search history.

(56) References Cited

U.S. PATENT DOCUMENTS

| | | |
|---|---|---|
| 2010/0039552 A1 | 2/2010 | Kao |
| 2014/0327764 A1 | 11/2014 | Nelson |
| 2015/0362826 A1 | 12/2015 | Araki |
| 2017/0134621 A1* | 5/2017 | Tompkins .............. F16M 11/08 |

FOREIGN PATENT DOCUMENTS

| | | |
|---|---|---|
| JP | 2000295504 A | 10/2000 |
| JP | 2008085999 A | 4/2008 |
| JP | 2009077090 A | 4/2009 |
| JP | 2010054598 A | 3/2010 |
| JP | 2012075061 A | 4/2012 |
| WO | 2014125743 A1 | 8/2014 |
| WO | 2015073168 A1 | 5/2015 |

OTHER PUBLICATIONS

European Search Report for corresponding EP Application No. 17181121, 8 pages, dated Dec. 5, 2017.
Sony Corp.: "PS4 Playstation camera CUH-ZEY2", Sep. 7, 2016 (Sep. 7, 2016), XP055428299, Retrieved from the Internet: URL:https://fwww.playstation.comjen-aejcontentjdamjsupport/manualsjsceejweb-manuals/peripherals/ps4/PS-Camera-2016/PS4 CameraManual Web EN.pdf [retrieved-on Nov. 23, 2017].

* cited by examiner

CAMERA, STAND, AND CAMERA UNIT HAVING CAMERA AND STAND

BACKGROUND

The present disclosure relates to a camera, a stand, and a camera unit having these camera and stand that are mounted on a display apparatus.

U.S. Patent Application Publication No. 2015/0362826 (hereinafter referred to as Patent Document 1) discloses a camera that is mounted on the upper rim of a display apparatus (a television receiver or a display of a personal computer, for example). The camera is mounted on the upper rim of the display apparatus through a stand. In many cases, the camera of this type is configured such that the direction of a light receiving section thereof is vertically adjustable. The camera disclosed in Patent Document 1 has a support section attached to a stand and a camera body arranged at the left side of the support section. The camera body is connected to the support section such that the camera body is rotatable around the centerline along the left-right direction. The light receiving section is arranged on the camera body. Rotating the camera body allows the vertical adjustment of the direction of the light receiving section.

SUMMARY

Simplification of a structure that allows the adjustment of camera directions can reduce the number of parts used and facilitate assembly processes.

Therefore, it is desirable to provide a camera, a stand, and a camera unit having these camera and stand that allow the adjustment of camera directions with a simple structure.

According to an embodiment of the present disclosure, there is provided a camera including: a light receiving section; and a camera body incorporating the light receiving section, wherein an outside surface of the camera body has, at least on a portion thereof, a curve surface curving around a rotation centerline extending along a left-right direction, the curve surface being arranged inside a holding section of a stand, and the curve surface, when the camera body is seen in the left-right direction, is formed at least at portions positioned opposite to each other around the rotation centerline. According to this setup, a structure for enabling the adjustment in the directions of the camera can be realized comparatively easily.

According to another embodiment of the present disclosure, there is provided a stand including: a camera holding section configured to hold an outside of a camera; the camera holding section being formed so as to enclose an outside surface of the camera at an angle of at least 180 degrees when the camera holding section is seen in a left-right direction; the camera holding section having an inside surface formed so as to make the camera rotatable around a rotation centerline extending along the left-right direction. According to this setup, the camera body can be held and the rotation thereof is allowed by a comparatively simple structure (namely, the camera holding section).

According to a further embodiment of the present disclosure, there is provided a camera unit including: a camera having a light receiving section and a camera body accommodating the light receiving section; and a stand having a camera holding section configured to hold an outside of the camera body, wherein the camera holding section is formed so as to enclose an outside surface of the camera body at an angle of at least 180 degrees when the camera holding section is seen in a left-right direction, and at least one of an inside surface of the camera holding section and the outside surface of the camera body has a curve surface curving around a rotation centerline extending along the left-right direction. According to this setup, the camera body can be held and the rotation thereof is allowed by a comparatively simple structure (namely, the camera holding section and the curve surface).

BRIEF DESCRIPTION OF THE DRAWINGS

These and other objects of the present disclosure will become apparent from the following description of embodiments with reference to the accompanying drawings in which.

DETAILED DESCRIPTION OF THE PREFERRED EMBODIMENTS

Figure 2:
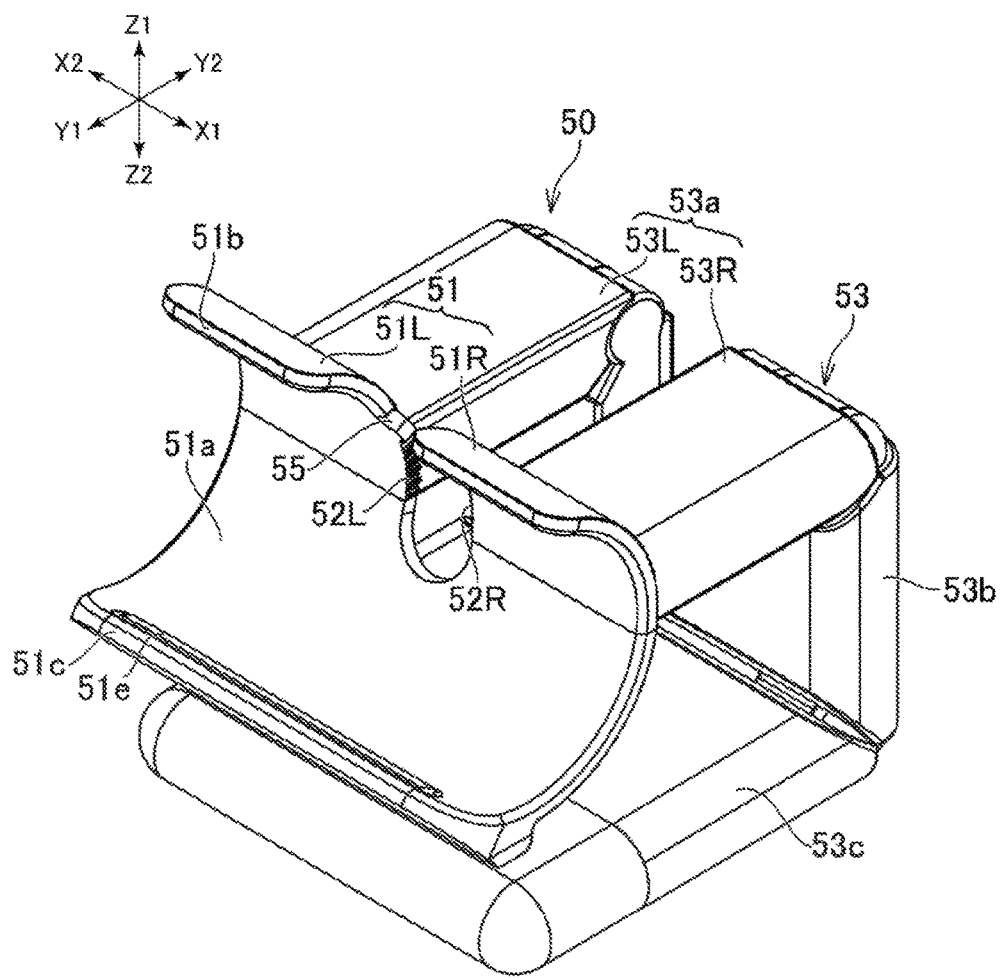
FIG. 2 is a perspective view illustrating the stand shown in FIG. 1.
Figure 3:
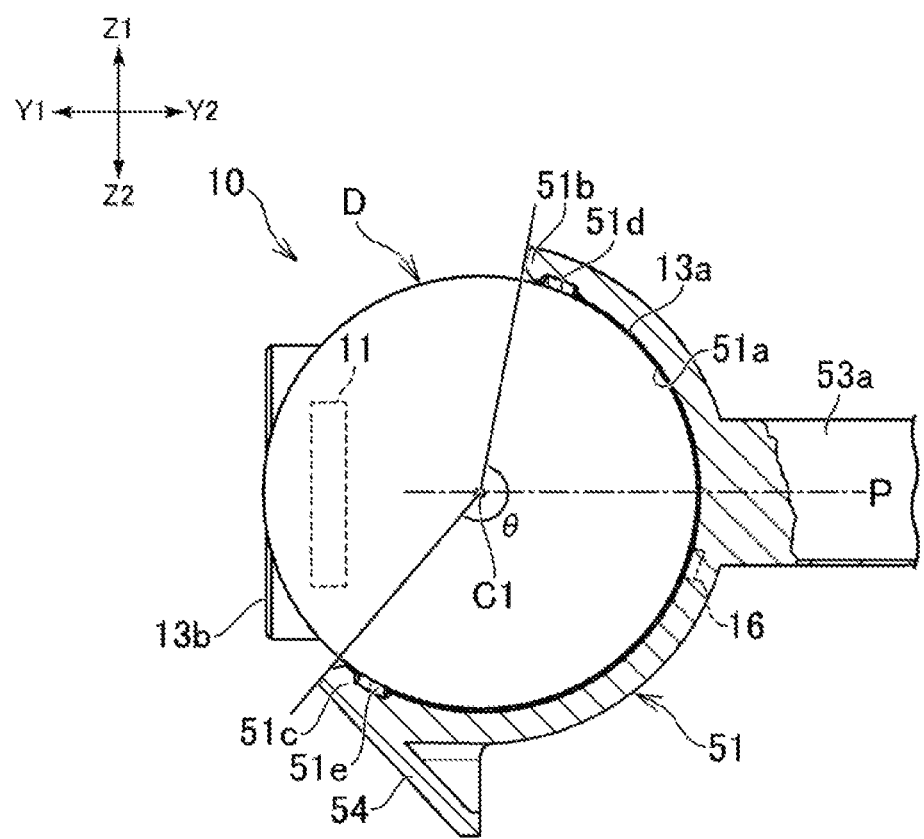
FIG. 3 is a cross sectional view illustrating the stand as cut by line III-III shown in FIG. 1.
Figure 4:
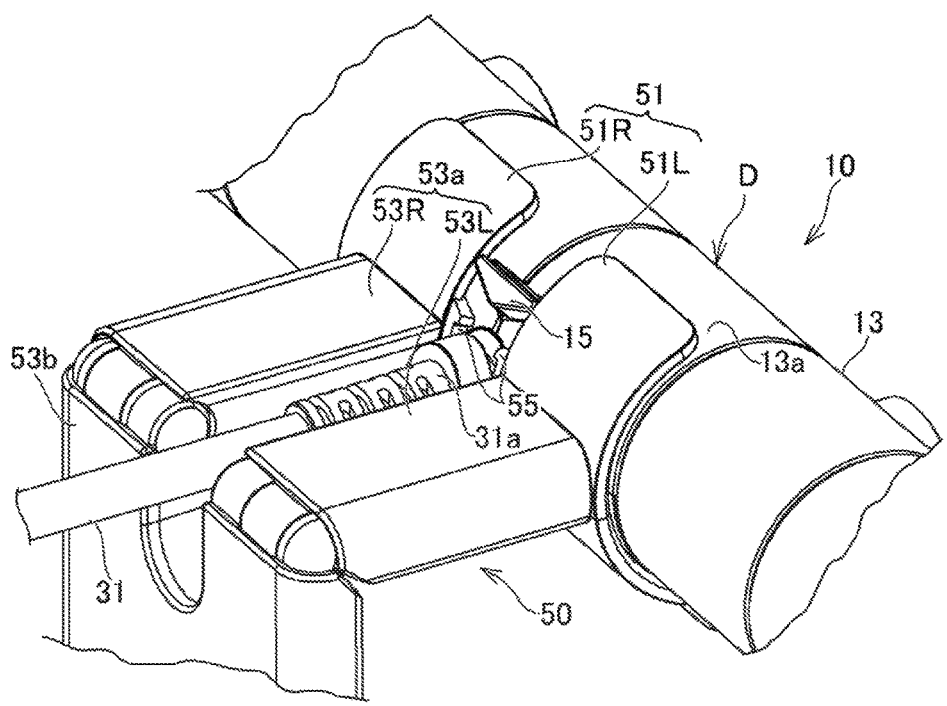
FIG. 4 is a perspective view illustrating the rear sides of the camera and the stand.
Figure 5:
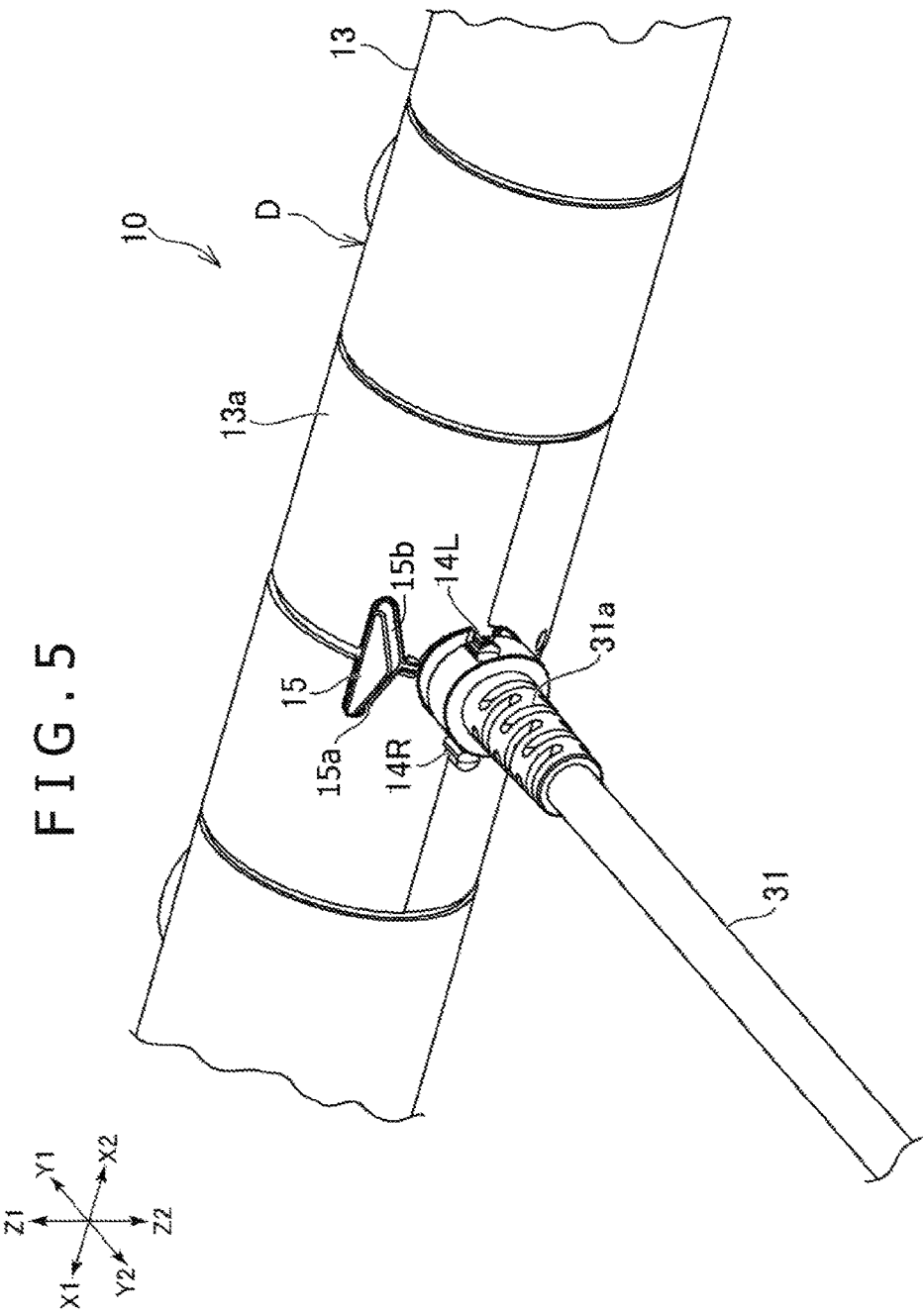
FIG. 5 is a perspective view illustrating the rear side of a camera body.
Figure 6:
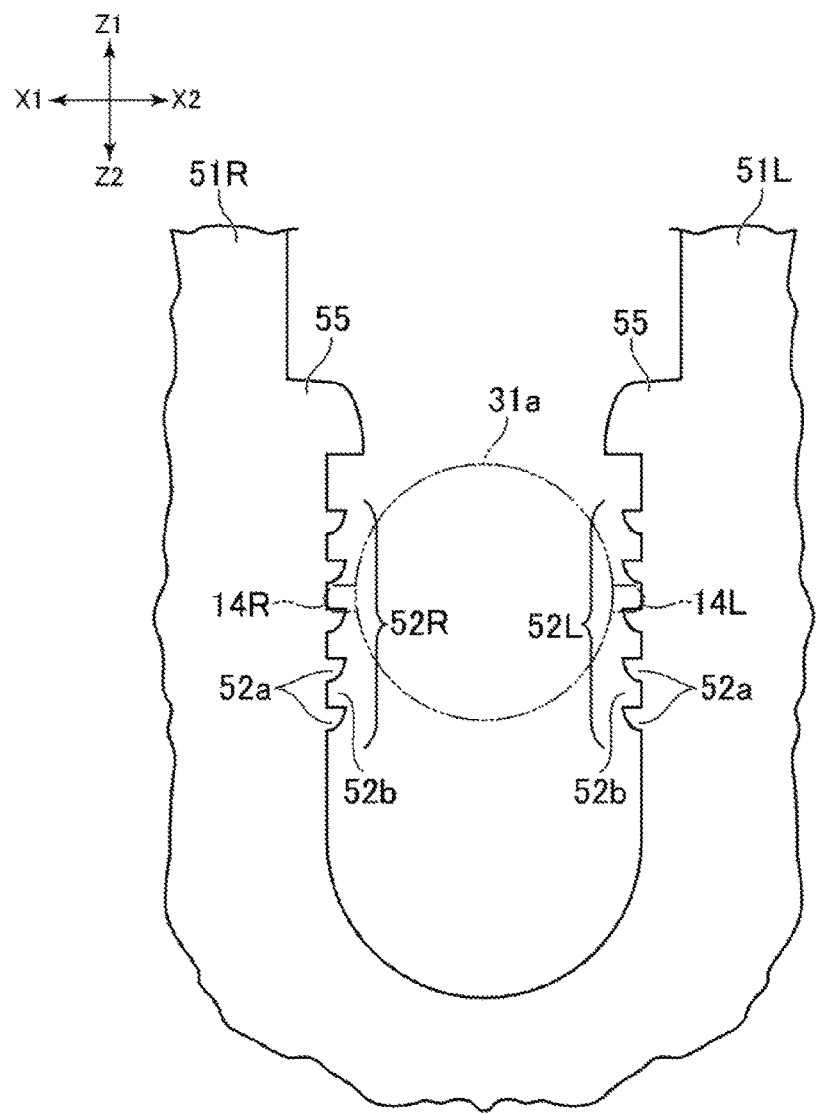
FIG. 6 is a diagram illustrating an engaging section formed on the stand.
Figure 7:
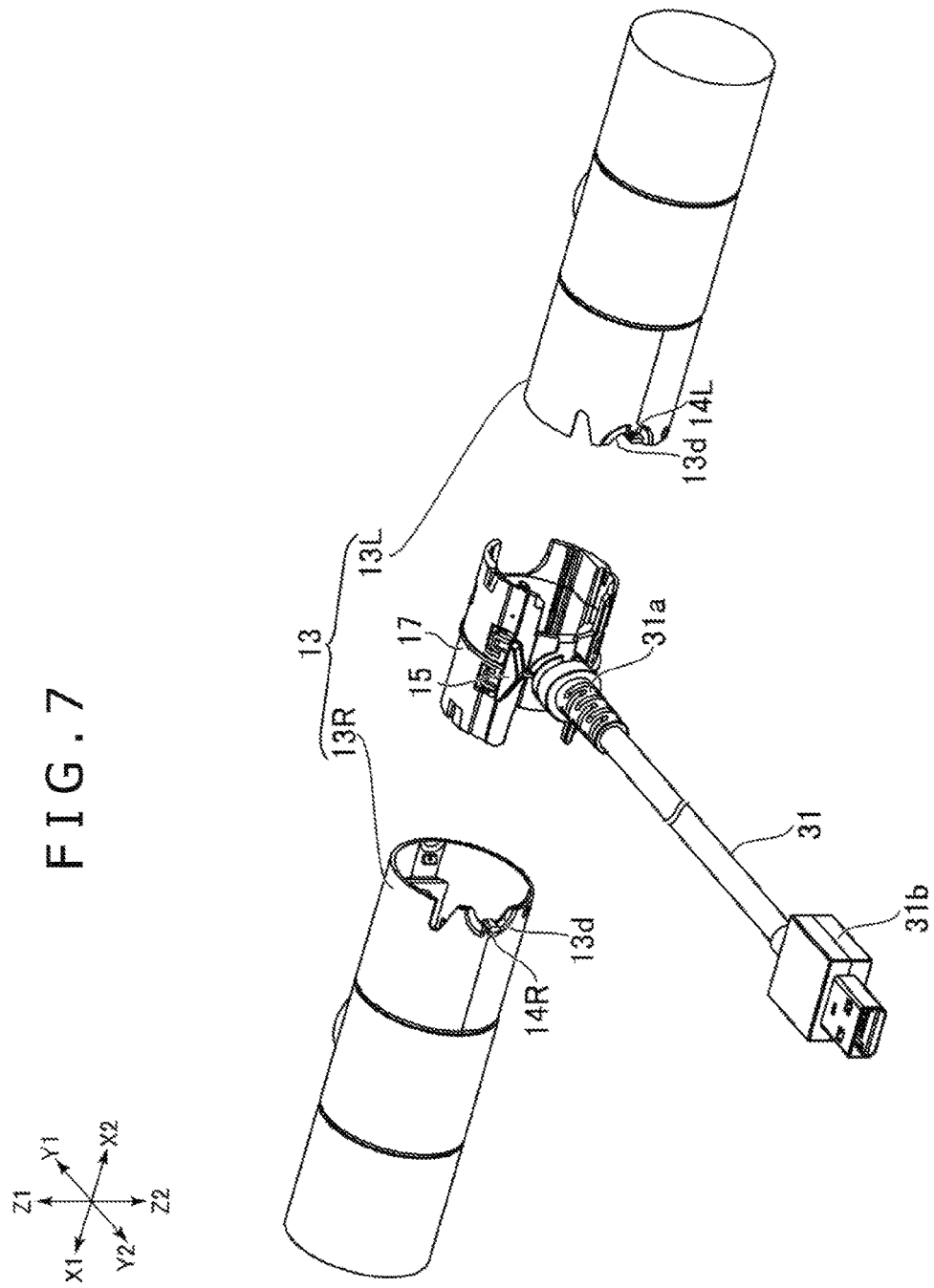
FIG. 7 is an exploded perspective view illustrating a housing of the camera.

The technology disclosed herein will be described in further detail by way of embodiments thereof with reference to the accompanying drawings. Now, referring to FIG. 1, there is shown a perspective view illustrating a camera unit 1 that includes a camera 10 and a stand 50 practiced as one embodiment of the present disclosure. FIG. 2 is a perspective view illustrating the stand 50 shown in FIG. 1. FIG. 3 is a cross sectional view illustrating the stand 50 as cut by line III-III shown in FIG. 1. FIG. 4 is a perspective view illustrating the rear sides of the camera 10 and the stand 50. FIG. 5 is a perspective view illustrating the rear side of a camera body D. FIG. 6 is a diagram illustrating an engaging section 52 formed on the stand 50. FIG. 7 is an exploded perspective view illustrating a housing 13 of the camera 10.

Figure 1:
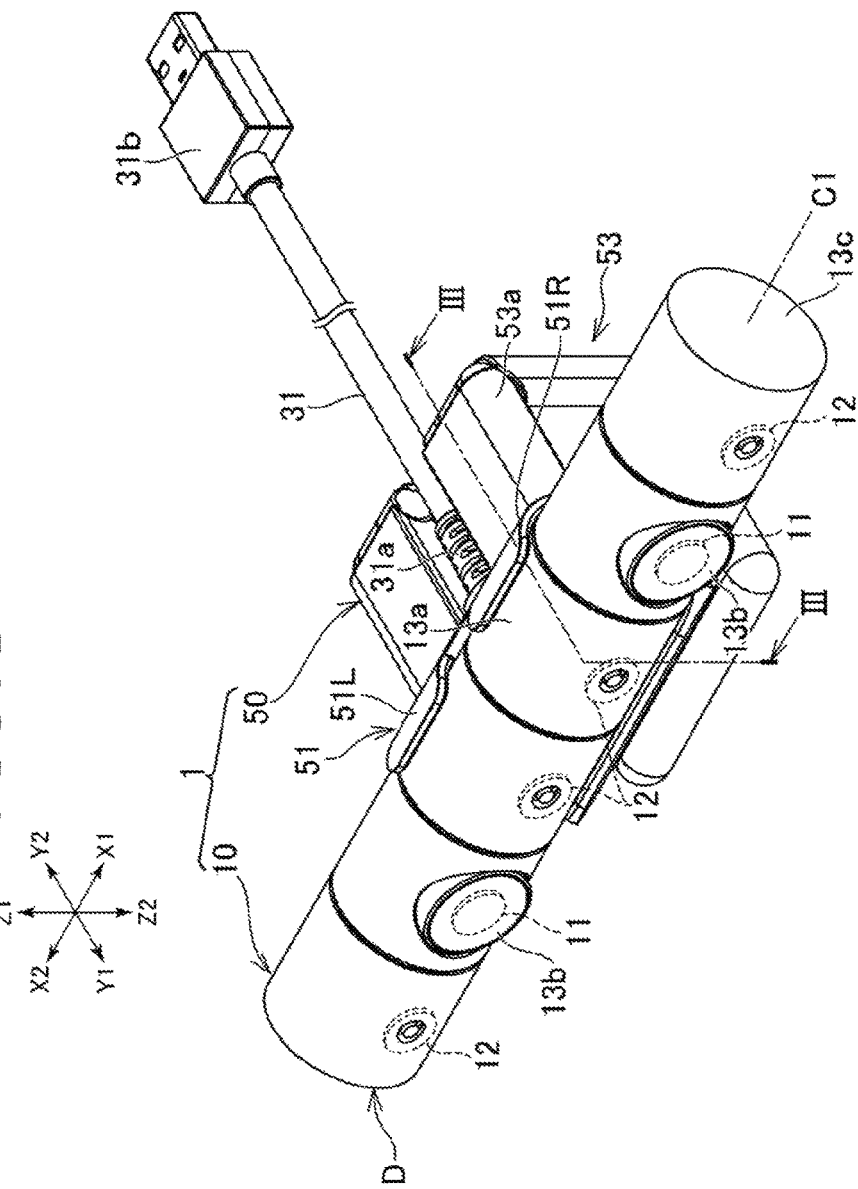
FIG. 1 is a perspective view illustrating a camera unit having a camera and a stand according to an embodiment of the present disclosure.

In what follows, X1 and X2 shown in FIG. 1 are referred to as a right direction and a left direction, Y1 and Y2 as a forward direction and backward direction, and Z1 and Z2 as an upward direction and a downward direction, respectively. A direction of a light receiving section 11 to be described later, namely, the direction of an optical axis of the light receiving section 11, is the forward direction.

The camera unit 1 includes the camera 10 and the stand 50 as shown in FIG. 1. The stand 50 is mounted on the upper rim of a thin display apparatus (a television receiver or a display of a personal computer, for example) when the camera 10 is in use, thereby supporting the camera 10.

As shown in FIG. 1, the camera 10 has the camera body D and a cable 31 connected to the camera body D. In the example of the camera 10, the cable 31 is connected to the rear side of the camera body D. In addition, in the example of the camera 10, the cable 31 is connected to the center of the camera body D in the left-right direction. A connector 31b is mounted on an end portion of the cable 31. The connector 31b is a universal serial bus (USB) connector, for example, or may be a connector of another kind. The connection position of the cable 31 is not limited to the example of the camera 10. For example, the cable 31 may be connected to one side surface of the camera body D.

As shown in FIG. 1, the camera body D has a light receiving section 11 that captures external light. The light receiving section 11 includes a lens module and a light receiving element. When in use, the camera 10 is connected to an information processing apparatus such as a game apparatus or a personal computer through the cable 31 so as to transmit image data obtained through the light receiving section 11 to the information processing apparatus. In the example of the camera 10, the camera body D has two light receiving sections 11 at positions separated from each other in the left-right direction. In the information processing apparatus, a three-dimensional image can be generated on the basis of the image data obtained through the two light receiving sections 11. The number of light receiving sections 11 is not limited to two; one light receiving section 11 is also allowed.

As shown in FIG. 1, the camera body D has a microphone 12. The camera 10 transmits audio data picked up by the microphone 12 to the information processing apparatus through the cable 31. In the example of the camera 10, the camera body D has a plurality of microphones 12 at positions separated from each other in the left-right direction. In the information processing apparatus, the position of a sound source can be calculated on the basis of audio data obtained through the plurality of microphones 12. The plurality of microphones 12 are arranged in the left-right direction together with the two light receiving sections 11. In the example of camera 10, the camera body D has four microphones 12. Two of the microphones 12 are arranged between the two light receiving sections 11. The other two microphones 12 are arranged outside the two light receiving sections 11. That is, one microphone 12 is arranged in the right direction of the light receiving section 11 on the right side and another microphone 12 is arranged in the left direction of the light receiving section 11 on the left side. The camera 10 is formed symmetrical in the left-right direction. In other words, the two light receiving sections 11 and the four microphones 12 are laid out so as to be symmetrical in the left-right direction.

The layouts of the microphone 12 and the light receiving section 11 are not limited to the example of the camera 10. For example, all of the four microphones 12 may be arranged outside the two light receiving sections 11. Further, the camera body D may have three microphones 12, one microphone 12 being arranged between the two light receiving sections 11 and the other two microphones 12 being arranged outside the light receiving sections 11. Still further, in another example, the camera body D may have only two microphones 12. In this case, the microphones 12 may be arranged only outside the two light receiving sections 11.

As shown in FIG. 1, the camera body D is supported by the stand 50. The stand 50 has a camera holding section 51. The camera holding section 51 is formed so as to hold the outside of the camera body D. In the example of the stand 50, the camera holding section 51 is formed so as to enclose the outside surface of the camera body D at an angle of 180 degrees or more when the camera holding section 51 is viewed in the left-right direction as shown in FIG. 3. The camera body D is arranged inside the camera holding section 51. This arrangement allows the camera body D to be supported with the stand 50.

Referring to FIG. 3, an angle θ around a horizontal straight line C1 from one end portion 51b of the camera holding section 51 to the other end portion 51c is 180 degrees or more (as will be described later, the camera body D is rotatable around the straight line C1; in what follows the straight line C1 is referred to as a rotation centerline). In one example of the stand 50, the angle θ is 190 degrees or more. The two end portions 51b and 51c of the camera holding section 51 are separated from each other and the camera holding section 51 is open in one direction. In the example of the stand 50, the camera holding section 51 is open in the forward direction, enclosing the rear side of the camera body D. Instead of the example of the stand 50, the camera holding section 51 may be cylindrical. In other words, the camera holding section 51 may not have an opening when the camera holding section 51 is seen in the left-right direction.

As shown in FIG. 3, the inside surface of the camera holding section 51 is formed for the camera body D to be rotatable around the horizontal rotation centerline C1. To be more specific, the inside surface of the camera holding section 51 has a curve surface 51a that curves around the rotation centerline C1. The inside surface of the camera holding section 51 has the curve surface 51a at least at portions opposite to each other around the rotation centerline C1. With this shape of the camera holding section 51, the camera body D can be rotated around the rotation centerline C1 while being held by the camera holding section 51. Rotating the camera body D allows adjustment of the direction of the light receiving section 11 in the up-down direction. As described above, the camera body D has two light receiving sections 11. The curve surface 51a curving around the rotation centerline C1 allows the rotation of the camera body D while horizontally holding the rotation centerline C1. That is, this setup prevents the camera body D from tilting, or a right portion of the camera body D from raising over a left portion thereof, for example. As a result, the optical axes of the two light receiving sections 11 can be maintained parallel to each other.

In the example of the stand 50, the camera holding section 51 is formed so as to enclose the outside surface of the camera body D at an angle of 180 degrees or more and the curve surface 51a is formed over the entire inside surface of the camera holding section 51. This setup enhances the holding stability provided by the stand 50.

Instead of the example of the stand 50, only part of the inside surface of the camera holding section 51 may have the curve surface 51a curving around the rotation centerline C1. For example, the inside surface of the camera holding section 51 may have the curve surface 51a only at portions opposite to each other around the rotation centerline C1 (a portion near the end portion 51b (see FIG. 3) and a portion near the end portion 51c (see FIG. 3), for example). Then, the other portions of the inside surface of the camera holding section 51 may not be curved. That is, the other portions of the inside surface of the camera holding section 51 may be formed by flat surfaces. In this case, it is desired that the flat portions formed on the inside surface of the camera holding section 51 be not in contact with the outside surface of the camera body D in order to allow the rotation of the camera body D around the rotation centerline C1.

As shown in FIG. 3, the outside surface of the camera body D has a curve surface 13a that curves around the rotation centerline C1. The curve surface 13a is positioned at a portion corresponding to the curve surface 51a of the camera holding section 51. That is, in the example of the camera unit 1, both the curve surface 13a of the camera body D and the curve surface 51a of the camera holding section 51 curve around the rotation centerline C1. With this arrangement, when the camera body D is rotated, the curve surface 13a of the camera body D slides in contact with the curve surface 51a of the camera holding section 51. At this moment, a contact area between the outside surface of the camera body D and the inside surface of the camera holding section 51 can be secured, so that the camera body D can be rotated with stability. In addition, with the curve surface 13a of the camera body D and the curve surface 51a of the camera holding section 51, the camera body D can be rotated with the rotation centerline C1 maintained horizontal. That is, this arrangement can prevent the camera body D from tilting, or prevent the right portion of the camera body D from rising over the left portion, for example. As a result, the optical axes of the two light receiving sections 11 can be maintained parallel to each other. It should be noted that, between the outside surface of the camera body D and the inside surface of the camera holding section 51, a buffer material may be arranged, which will be described later. In this case, in the areas other than a buffer material, a slight clearance may exist between the outside surface of the camera body D and the inside surface of the camera holding section 51.

As shown in FIG. 3, when the camera body D is viewed in the left-right direction, the curve surface 13a is formed over an angle of 180 degrees or more around the rotation centerline C1. In the example of the camera 10, the curve surface 13a is formed over 360 degrees around the rotation centerline C1. That is, the outside surface of the camera body D is cylindrically formed around the rotation centerline C1. The radius of the outside surface (the curve surface 13a) of the camera body D corresponds to the radius of the inside surface (the curve surface 51a) of the camera holding section 51.

As shown in FIG. 1, the curve surface 13a is formed in a range that extends from a right side surface 13c of the camera body D to a left side surface thereof. In the example of the camera 10, the outside surface of the camera body D has a flat surface 13b at a position where the light receiving section 11 is arranged and is curved around the rotation centerline C1 in other areas.

The shape of the camera body D is not limited to the example of the camera 10. For example, the outside surface of the camera body D may have the curve surface 13a only in part in a circumferential direction around the rotation centerline C1. That is, the outside surface of the camera body D may have the arc curve surface 13a around the rotation centerline C1. For example, the curve surface 13a may be formed only at two portions opposite to each other around the rotation centerline C1. For example, the curve surface 13a may be formed only at an upper portion (a portion near the end portion 51b of the camera holding section 51, for example) of the camera body D and a lower portion (a portion near the end portion 51c of the camera holding section 51, for example) thereof. Then, the other portions (the rear side and the front side, for example) of the camera body D may be formed by flat surfaces. In this case, the inside surface of the camera holding section 51 of the stand 50 may have the curve surface 51a only at a position corresponding to the curve surface 13a or, like the example of the stand 50, may have the curve surface 51a all the circumferential areas around the rotation centerline C1.

Further, the outside surface of the camera body D may have the curve surface 13a only in part in the left-right direction. In the example of the camera unit 1, the width of the camera holding section 51 in the left-right direction is smaller than the width of the camera body D in the left-right direction. Therefore, the camera holding section 51 encloses only part (part in the left-right direction) of the camera body D. To be more specific, the camera holding section 51 encloses a portion between the two light receiving sections 11 in the camera body D. Therefore, the outside surface of the camera body D may have the curve surface 13a only at a portion corresponding to the curve surface 51a of the camera holding section 51. In other words, the outside surface of the camera body D may have the curve surface 13a only at a portion between the two light receiving sections 11. The other portions of the outside surface of the camera body D may be configured by flat surfaces. For example, the camera body D may be formed in a quadrangular prism at a portion positioned to the right of the right-side light receiving section 11 and at a portion positioned to the left of the left-side light receiving section 11.

As shown in FIG. 3, it is desired to arrange a plurality of buffer sections 51d, 51e, and 16 formed by a buffer material between the curve surface 51a of the camera holding section 51 and the curve surface 13a of the camera body D. The plurality of buffer sections 51d, 51e, and 16 are arranged circumferentially spaced from each other around the rotation centerline C1. This arrangement allows the protection of the outside surface of the camera body D. The buffer material is softer than the material of the camera holding section 51 and the material of the housing 13 making up the outside surface of the camera body D. For example, the material of the camera holding section 51 and the material of the housing 13 are acrylonitrile butadiene styrene (ABS) resin or polycarbonate resin. The material of the buffer sections is a rubber, for example.

In the example of the camera unit 1, the buffer sections 51d and 51e formed by a buffer material are attached to the curve surface 51a of the camera holding section 51 as shown in FIG. 3. The buffer sections 51d and 51e are elongated in the left-right direction. The buffer section 51d is positioned at the one end portion 51b of the camera holding section 51 while the buffer section 51e is positioned at the other end portion 51c of the camera holding section 51. In the example of the camera unit 1, the buffer section 16 is also arranged on the outside surface of the camera body D. The buffer section 16 is positioned between the two buffer sections 51d and 51e in the circumferential direction around the rotation centerline C1. The buffer section 16 is arranged below a base section 31a of the cable 31, for example, which will be described later.

The layouts of the buffer sections 51d, 51e, and 16 are not limited to the example of the camera unit 1. For example, the buffer section 16 may be arranged on the inside surface of the camera holding section 51. The buffer sections 51d and 51e may be arranged on the outside surface of the camera body D.

As shown in FIG. 5, in the example of the camera 10, the cable 31 is connected to the rear side of the camera body D. The cable 31 has the base section 31a connected to the camera body D. The base section 31a has a bushing for the reinforcement of the cable 31. As shown in FIG. 4, the camera holding section 51 of the stand 50 includes a right-side holding section 51R and a left-side holding section 51L that are spaced from each other in the left-right direction. The right-side holding section 51R and the left-side holding section 51L are configured so as to sandwich the base section 31a of the cable 31 in the left-right direction. The cable 31 extends to the backward between the right-side holding section 51R and the left-side holding section 51L. This setup can prevent the relative positional offset between the stand 50 and the camera 10 in the left-right direction. The right-side holding section 51R and the left-side holding section 51L are interconnected at the bottoms thereof (refer to FIG. 2).

In the example of the camera 10, the cable 31 is positioned at the center of the camera body D in the left-right direction. Therefore, the stand 50 holds the center section of the camera body D in the left-right direction. As a result, the camera body D can be supported by the stand 50 with stability. The cable 31 is connected to the center in the up-down direction of the camera body D.

The part to be arranged between the right-side holding section 51R and the left-side holding section 51L is not necessarily limited to the base section 31a of the cable 31. For example, the camera body D may have on the outside surface thereof a projecting section that is arranged between the right-side holding section 51R and the left-side holding section 51L. In this case, the cable 31 may be arranged at a position different from the camera holding section 51. For example, the cable 31 may be connected to a side surface of the camera body D.

As shown in FIG. 2, the stand 50 has an arm section 53 that extends backward from the camera holding section 51. The arm section 53 has a base section 53a (hereinafter the base section 53a is referred to as an arm base section). The camera holding section 51 is connected to the front end of the arm base section 53a. The arm base section 53a has a right-side arm section 53R and a left-side arm section 53L spaced from each other in the left-right direction. The right-side arm section 53R is connected to the right-side holding section 51R of the camera holding section 51 and the left-side arm section 53L is connected to the left-side holding section 51L of the camera holding section 51. As shown in FIG. 4, the cable 31 is positioned between the right-side arm section 53R and the left-side arm section 53L of the base section 31a. With this structure, the position of the camera body D can be lowered as compared with the structure in which the cable 31 is positioned above the arm base section 53a, for example. As a result, when the stand 50 and the camera 10 are mounted on the upper rim of a display apparatus, the camera body D can be arranged with stability.

The arm section 53 has a movable sections 53b and 53c. The first movable section 53b is linked to a rear end of the arm base section 53a and extends downward from the arm base section 53a. The first movable section 53b is linked to the rear end of the arm base section 53a so as to be rotatable around an axis line in the left-right direction. The rotation of the first movable section 53b allows the change of the angle between the first movable section 53b and the arm base section 53a. The second movable section 53c is linked to a lower end of the first movable section 53b. The second movable section 53c is linked to the lower end of the first movable section 53b so as to be rotatable around an axis line in the left-right direction. The rotation of the second movable section 53c allows the change of the angle between the first movable section 53b and the second movable section 53c.

The camera holding section 51 has a hook section 54 on a lower front rim thereof (refer to FIG. 3). When the stand 50 is in use, the base section 53a of the arm section 53 is arranged above the display apparatus and the hook section 54 is hooked on a front top section of the display apparatus. An end section of the second movable section 53c of the arm section 53 is hooked on a rear upper section of the display apparatus.

As shown in FIG. 4, the outside surface of the camera body D has a projecting section 15. The projecting section 15 is formed on the rear of the camera body D. The position of the projecting section 15 is higher than a horizontal plane P (refer to FIG. 3) that passes the center of the camera body D in the up-down direction. Use of this projecting section 15 can prevent the camera body D from being mounted on the stand 50 in a state where the attitude of the camera body D is reversed in the up-down direction.

As shown in FIG. 4, in the example of the camera 10, when the camera body D is mounted on the stand 50 in a correct attitude, the projecting section 15 is positioned between the right-side holding section 51R and the left-side holding section 51L of the camera holding section 51. The left-side rim of the right-side holding section 51R and the right-side rim of the left-side holding section 51L of the camera holding section 51 each have a stopper 55 that projects inward between the holding sections 51R and 51L. When the camera body D is mounted on the stand 50 in a correct attitude, the position of the projecting section 15 is higher than the stopper 55 as shown in FIG. 4. Because the position of the projecting section 15 is higher than the horizontal plane P, attempting to mount the camera body D onto the stand 50 in a state where the attitude of the camera body D is reversed in the up-down direction causes the projecting section 15 to collide with the stopper 55. This prevents the camera body D from being mounted on the stand 50. The projecting section 15 is positioned above the base section 31a of the cable 31. Consequently, the projecting section 15 can be arranged at a portion sandwiching the base section 31a of the cable 31 in the left-right direction; to be more specific, the projecting section 15 can be arranged between the left-side rim of the right-side holding section 51R and the right-side rim of the left-side holding section 51L.

In the example of the camera 10, the projecting section 15 is approximately triangular directed downward. Therefore, the projecting section 15 has a slope 15a (refer to FIG. 5) extending rightward and upward from its lower end and a slope 15b (refer to FIG. 5) extending leftward and upward from the lower end. These slopes 15a and 15b allow the projecting section 15 to be smoothly inserted between the right-side holding section 51R and the left-side holding section 51L of the camera holding section 51. The shape of the projecting section 15 is not limited to the example of the camera 10 and therefore can be appropriately changed.

As described above, the camera body D is rotatable around the rotation centerline C1 in a state where the camera body D is held by the camera holding section 51. The camera body D is formed with engaging sections 14R and 14L and the stand 50 is formed with engaging sections 52R and 52L, the engaging sections 14R and 14L being engaged with the engaging sections 52R and 52L, respectively (refer to FIG. 5 and FIG. 6). The rotation of the camera body D is regulated in the state where the engaging sections 14R and 14L are engaged with the engaging sections 52R and 52L, respectively. Consequently, the attitude (the position in the rotary direction) of the camera body D can be stabilized.

As shown in FIG. 5, in the example of the camera 10, the camera body D has the engaging section 14R arranged on the right side of the base section 31a of the cable 31 and the engaging section 14L arranged on the left side of the base section 31a of the cable 31 (hereinafter, the engaging section 14R of the camera body D is referred to as a right-side engaging section and the engaging section 14L is referred to as a left-side engaging section). The right-side engaging section 14R of the camera body D is arranged so as to project to the right direction and the left-side engaging section 14L of the camera body D is arranged so as to project to the left direction. As shown in FIG. 6, the left-side rim of the right-side holding section 51R of the camera holding section 51 is formed with the engaging section 52R and the right-side rim of the left-side holding section 51L is formed with the engaging section 52L. The right-side engaging section 14R of the camera body D is engaged with the engaging section 52R of the right-side holding section 51R positioned in the right direction of this right-side engaging section 14R. The left-side engaging section 14L of the camera body D is engaged with the engaging section 52L of the left-side holding section 51L positioned in the left direction of this left-side engaging section 14L. This structure can prevent the camera holding section 51 from getting larger in the radial direction of the rotation centerline C1. That is, in a structure where the engaging section 52R and the engaging section 52L of the right-side holding section 51R and the left-side holding section 51L are formed on the inside surface of the right-side holding section 51R and the left-side holding section 51L, respectively, so as to be engaged with the engaging sections formed on the outside surface of the camera body D, for example, the engaging section 52R and the engaging section 52L of the right-side holding section 51R and the left-side holding section 51L are positioned in the radial direction of the rotation centerline C1 relative to the engaging sections of the camera body D. Consequently, the camera holding section 51 need to be made larger in the radial direction of the rotation centerline C1 by the amounts of the engaging section 52R and the engaging section 52L of the right-side holding section 51R and the left-side holding section 51L. In the examples of the stand 50 and the camera 10, the right-side engaging section 14R of the camera body D is opposed to the engaging section 52R of the right-side holding section 51R in the left-right direction and the left-side engaging section 14L of the camera body D is opposed to the engaging section 52L of the left-side holding section 51L in the left-right direction, so that the right-side holding section 51R and the left-side holding section 51L need not be made larger in the radial direction of the rotation centerline C1 by the amounts of the engaging section 52R and the engaging section 52L of the right-side holding section 51R and the left-side holding section 51L.

As shown in FIG. 6, the engaging section 52R of the right-side holding section 51R and the engaging section 52L of the left-side holding section 51L each have a plurality of projecting sections 52a aligned in the up-down direction. Each projecting section 52a projects in the left-right direction. In detail, at the engaging section 52R of the right-side holding section 51R, the projecting section 52a projects in the left direction. At the engaging section 52L of the left-side holding section 51L, the projecting section 52a projects in the right direction. Therefore, a recessed section 52b is formed between two projecting sections 52a adjacent to each other in the up-down direction. At each of the right-side holding section 51R and the left-side holding section 51L, a plurality of recessed sections 52b are aligned in the up-down direction. An end section of the right-side engaging section 14R of the camera body D is fitted with the recessed section 52b of the engaging section 52R of the right-side holding section 51R. That is, the right-side engaging section 14R of the camera body D is engaged with the engaging section 52R of the right-side holding section 51R. An end section of the left-side engaging section 14L of the camera body D is fitted with the recessed section 52b of the engaging section 52L of the left-side holding section 51L. That is, the left-side engaging section 14L of the camera body D is engaged with the engaging section 52L of the left-side holding section 51L.

The right-side holding section 51R and the left-side holding section 51L each are elastically deformable in the left-right direction. In detail, the right-side holding section 51R is elastically deformable in the right direction and the left-side holding section 51L is elastically deformable in the left direction. That is, the right-side holding section 51R and the left-side holding section 51L are elastically deformable such that a space therebetween is extended in the left-right direction. Attempting to rotate the camera body D around the rotation centerline C1 elastically deforms the right-side holding section 51R and the left-side holding section 51L, thereby slightly expanding the space therebetween. As a result, the engagement between the right-side engaging section 14R of the camera body D and the engaging section 52R of the right-side holding section 51R is temporarily cleared, and the engagement between the left-side engaging section 14L of the camera body D and the engaging section 52L of the left-side holding section 51L is temporarily cleared. Then, the right-side engaging section 14R and the left-side engaging section 14L of the camera body D move to the recessed section 52b by one step up or the recessed section 52b by one step down formed on the engaging section 52R and the engaging section 52L of the right-side holding section 51R and the left-side holding section 51L. As described above, on each of the right-side holding section 51R and the left-side holding section 51L, a plurality of recessed sections 52b are aligned in the up-down direction. This setup consequently allows the stepwise adjustment of the position of the camera body D around the rotation centerline C1.

As described above, the right-side engaging section 14R and the left-side engaging section 14L of the camera body D are formed along the base section 31a of the cable 31. This setup allows the right-side engaging section 14R and the left-side engaging section 14L of the camera body D to be supported by the base section 31a of the cable 31 when the right-side engaging section 14R and the left-side engaging section 14L of the camera body D expand the space between the right-side and left-side engaging sections 52R and 52L formed on the right-side holding section 51R and the left-side holding section 51L along with the rotation of the camera body D.

The base section 31a of the cable 31 is connected to the center of the camera body D in the left-right direction. Therefore, the movement of the center of the camera body D in the left-right direction (the rotation of the camera body D around the rotation centerline C1) is regulated by the engaging sections 52R and 52L of the camera holding section 51. Therefore, as compared with a structure in which the base section 31a of the cable 31 is connected to the right-side end or the left-side end of the camera body D, for example, the attitude of the camera body D can be stabilized.

The structures of the right-side engaging section 14R, the left-side engaging section 14L, the engaging section 52R, and the engaging section 52L are not limited to the examples of the camera 10 and the stand 50. For example, the right-side engaging section 14R and the left-side engaging section 14L of the camera body D may each have a plurality of projecting sections aligned in the up-down direction (in other words, a plurality of recessed sections aligned in the up-down direction) and the engaging section 52R and the engaging section 52L of the right-side holding section 51R and the left-side holding section 51L may each have a projecting section that is to be fitted with a recessed section formed between two adjacent projecting sections. In addition, in another example, the camera body D may have recessed sections formed at the right side and the left side of the base section 31a of the cable 31, these recessed sections being for use as the right-side engaging section 14R and the left-side engaging section 14L of the camera body D. In this case, the engaging section 52R and the engaging section 52L of the right-side holding section 51R and the left-side holding section 51L may be each formed with a plurality of projecting sections aligned in the up-down direction that are to be fitted with the engaging sections (the recessed sections) of the camera body D. In still another example, the engaging section 52R and the engaging section 52L of the right-side holding section 51R and the left-side holding section 51L may be formed on the inside surface of the camera holding section 51. In this case, the right-side engaging section 14R and left-side engaging section 14L of the camera body D may be formed on the outside surface of the camera body D so as to be engaged with the engaging section 52R and the engaging section 52L. Further, the camera body D may not always have a pair of the right-side engaging section 14R and the left-side engaging section 14L. That is, the camera body D may only have one engaging section. Likewise, the camera holding section 51 may not always have a pair of the engaging section 52R and the engaging section 52L. That is, the camera holding section 51 may only have one engaging section.

The camera body D has the housing 13 for accommodating the light receiving sections 11 and the microphones 12. As shown in FIG. 7, the housing 13 has a right-side housing section 13R and a left-side housing section 13L. The right-side housing section 13R is a cylinder opening in the left direction and the left-side housing section 13L is a cylinder opening in the right direction. The right-side housing section 13R and the left-side housing section 13L are combined in the left-right direction so as to form the housing 13. Each of the right-side housing section 13R and the left-side housing section 13L is integrally molded by resin (ABS resin or polycarbonate, for example).

According to the housing 13, a joint surface extending in the left-right direction does not exist between the two housing sections (a joint surface circumferentially extending around the rotation centerline C1 exists between the right-side housing section 13R and the left-side housing section 13L). Therefore, the camera body D can be smoothly rotated in the circumferential direction around the rotation centerline C1. For example, in a structure where the housing is made up of a front housing section and a rear housing section that are combined in the front-back direction, a joint surface extending in the left-right direction exists between the front housing section and the rear housing section. In this case, an attempt to rotate the camera body D may cause the inside surface of the camera holding section 51 or the above-described buffer section 51d, 51e, or 16 (refer to FIG. 3) to be caught on the joint surface, thereby hampering the smooth rotation of the camera body D. According to the housing 13 made up of the right-side housing section 13R and the left-side housing section 13L that are combined in the left-right direction, such a catch can be prevented. In addition, in a structure where the housing 13 is made up of the front housing section and the rear housing section, an attempt to rotate the camera body D around the rotation centerline C1 may cause the front housing section and the rear housing section to be offset in the joint surfaces thereof in the left-right direction, thereby slightly deforming the housing 13. According to the housing 13, such a deformation can be prevented.

In the example of the camera 10, the base section 31a of the cable 31 is arranged between the right-side housing section 13R and the left-side housing section 13L. As shown in FIG. 7, the left-side rim of the right-side housing section 13R is formed with a recessed section 13d and the right-side rim of the left-side housing section 13L is also formed with a recessed section 13d. The combination of the two recessed sections 13d forms an opening through which the base section 31a of the cable 31 passes. According to this structure, the assembly (the manufacturing) of the camera 10 can be facilitated as compared with a structure in which only one housing section is formed with an opening through which the cable 31 is passed. The above-mentioned right-side engaging section 14R and left-side engaging section 14L of the camera body D are formed on the rims of the recessed sections 13d of the right-side housing section 13R and the left-side housing section 13L.

In the example of the camera 10, a linking member 17 that is molded separately from the right-side housing section 13R and the left-side housing section 13L is arranged inside the housing 13. The linking member 17 is positioned in the boundary between the right-side housing section 13R and the left-side housing section 13L. In other words, a part of the linking member 17 is positioned inside the right-side housing section 13R and another part is positioned inside the left-side housing section 13L. Each of the right-side housing section 13R and the left-side housing section 13L is fixed to the linking member 17. According to this structure, the molding of the right-side housing section 13R and the left-side housing section 13L is facilitated as compared with a structure in which substantially a same structure as the linking member 17 is molded on one of the right-side housing section 13R and the left-side housing section 13L, for example. For example, with a structure in which the linking member 17 is molded integrally with the right-side housing section 13R, the right-side housing section 13R gets deeper in the left-right direction, thereby making it difficult to mold the right-side housing section 13R. Unitizing the right-side housing section 13R and the left-side housing section 13L by use of the linking member 17 facilitates the molding of these sections. In the example of the camera 10, the width of the right-side housing section 13R in the left-right direction is the same as the width of the left-side housing section 13L in the left-right direction. This facilitates the fabrication of the two housing sections.

As shown in FIG. 7, the base section 31a of the cable 31 is attached to the linking member 17. In detail, the base section 31a of the cable 31 is attached to the rear side of the linking member 17 and extending backward through an opening formed by the recessed sections 13d of the right-side housing section 13R and the left-side housing section 13L.

The linking member 17 links the right-side housing section 13R and the left-side housing section 13L to each other with the rim of the right-side housing section 13R and the rim of the left-side housing section 13L coming into contact with each other. On each of the linking member 17 and the right-side housing section 13R and the left-side housing section 13L, a claw section or a recessed section is formed with which they are linked one another.

The linking member 17 is cylindrical around the rotation centerline C1. Therefore, the space inside the right-side housing section 13R and the space inside the left-side housing section 13L are linked with each other.

The external diameter of the linking member 17 corresponds to the inner diameters of the right-side housing section 13R and the left-side housing section 13L. This setup reduces the backlash of the right-side housing section 13R and the left-side housing section 13L.

The structure of the housing 13 is not limited to the example of the camera 10. For example, if the width of the housing 13 in the left-right direction is comparatively small, then one of the right-side housing section 13R and the left-side housing section 13L may be deeper than the other. In this case, the linking member 17 may not be necessarily used for the unitization of the right-side housing section 13R and the left-side housing section 13L.

As described above, the outside surface of the camera body D has, at least in one portion thereof, the curve surface 13a that curves around the rotation centerline C1 extending along the left-right direction and is arranged inside the camera holding section 51 of the stand 50. When the camera body D is seen from the left-right direction, the curve surface 13a is formed at least at portions positioned opposite to each other around the rotation centerline C1. This setup allows the sliding of the curve surface 13a relative to the inside surface of the camera holding section 51. As a result, the rotation of the camera body D is allowed by a comparatively simple structure (namely, the curve surface 13a).

When the camera holding section 51 is seen in the left-right direction, the camera holding section 51 is formed so as to enclose the outside surface of the camera 10 at an angle of 180 degrees or more. The inside surface of the camera holding section 51 is formed such that the camera 10 is rotatable around the rotation centerline C1 extending along the left-right direction. This setup allows the holding of the camera body D and the rotation of the camera body D by a comparatively simple structure (namely, the camera holding section 51).

The camera unit 1 has the camera 10 having the light receiving sections 11 and the camera body D accommodating the light receiving sections 11 and the stand 50 having the camera holding section 51 for holding the camera body D on the outside thereof. When the camera holding section 51 is seen in the left-right direction, the camera holding section 51 is formed so as to enclose the outside surface of the camera body D at an angle of 180 degrees or more. At least one of the inside surface of the camera holding section 51 and the outside surface of the camera body D has a curve surface (13a or 51a) that curves around the rotation centerline C1 extending along the left-right direction. This setup allows the holding of the camera body D and the rotation of the camera body D by a comparatively simple structure (namely, the camera holding section 51, and the curve surface 13a or and the curve surface 51a).

The present disclosure is not limited to the camera 10, the stand 50, and the camera unit 1 described above, and various changes may be made.

For example, in the example of the stand 50, the inside surface of the camera holding section 51 is arc. In the example of the camera 10, the outside surface of the camera body D is cylindrical. Instead of these examples, the camera holding section 51 may be formed cylindrical. In this case, the camera body D may not be cylindrical and may be formed in a quadrangular prism. In this case, the camera body D comes in contact with the inside surface of the camera holding section 51 at the four corners of the prism and is held by the camera holding section 51 to be made rotatable inside the camera holding section 51. In another example, while the camera body D is cylindrical, the camera holding section 51 may be of square cylinder that encloses the camera body D when the camera holding section 51 is seen in the left-right direction.

The present disclosure contains subject matter related to that disclosed in Japanese Priority Patent Application JP 2016-138304 filed in the Japan Patent Office on Jul. 13, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera comprising:
   a light receiving section;
   a camera body incorporating the light receiving section; and
   a cable including a base section connected to a rear side of the camera body, wherein:
   an outside surface of the camera body has, at least on a portion thereof, a curve surface curving around a rotation centerline extending along a left-right direction, the curve surface being arranged inside a holding section of a stand,
   the curve surface, when the camera body is seen in the left-right direction, is formed at least at portions positioned opposite to each other around the rotation centerline,
   the camera body is arranged with a first engaging section configured to regulate a rotation of the camera body around the rotation centerline in a state where the first engaging section is engaged with a second engaging section of the stand, and
   the first engaging section is arranged at the base section of the cable.

2. The camera according to claim 1, wherein the curve surface is formed over an angle of at least 180 degrees around the rotation centerline.

3. The camera according to claim 2, wherein
   the curve surface is formed cylindrical, and
   the outside surface of the camera body has the curve surface at least at one portion in the left-right direction.

4. The camera according to claim 1,
   wherein the first engaging section is arranged at a right side and a left side of the base section of the cable.

5. The camera according to claim 1, wherein
   the camera body is configured by a right-side housing section and a left-side housing section that are unitized in the left-right direction,
   the right-side housing section is cylindrical opening in a left direction, and
   the left-side housing section is cylindrical opening in a right direction.

6. A stand comprising:
   a camera holding section configured to hold an outside of a camera;
   the camera holding section being formed so as to enclose an outside surface of the camera at an angle of at least 180 degrees when the camera holding section is seen in a left-right direction;
   the camera holding section having an inside surface formed so as to make the camera rotatable around a rotation centerline extending along the left-right direction, wherein:
   the camera has a cable including a base section connected to a rear side of the camera body,
   the camera body is arranged with a first engaging section configured to regulate a rotation of the camera body around the rotation centerline in a state where the first engaging section is engaged with a second engaging section of the stand, and the first engaging section is arranged at the base section of the cable.

7. The stand according to claim 6, wherein
the inside surface of the camera holding section has a curve surface curving around the rotation centerline, and
the curve surface is formed at least at portions positioned opposite to each other around the rotation centerline when the camera holding section is seen in the left-right direction.

8. The stand according to claim 7, wherein the curve surface is formed over an angle of at least 180 degrees around the rotation centerline when the camera holding section is seen in the left-right direction.

9. The stand according to claim 6, wherein
the camera holding section includes a right-side section and a left-side section spaced from each other in the left-right direction, and
the right-side section and the left-side section are configured so as to sandwich a base section of a cable extending backward from the camera.

10. The stand according to claim 9, wherein a left-side rim of the right-side section and a right-side rim of the left-side section each have a second engaging section that is engaged with a first engaging section arranged on the base section of the cable.

11. A camera unit comprising:
a camera having a light receiving section, a camera body accommodating the light receiving section, and a cable including a base section connected to a rear side of the camera body; and
a stand having a camera holding section configured to hold an outside of the camera body, wherein:
the camera holding section is formed so as to enclose an outside surface of the camera body at an angle of at least 180 degrees when the camera holding section is seen in a left-right direction,
at least one of an inside surface of the camera holding section and the outside surface of the camera body has a curve surface curving around a rotation centerline extending along the left-right direction,
the camera body is arranged with a first engaging section configured to regulate a rotation of the camera body around the rotation centerline in a state where the first engaging section is engaged with a second engaging section of the stand, and
the first engaging section is arranged at the base section of the cable.

12. The camera unit according to claim 11, wherein the inside surface of the camera holding section and the outside surface of the camera body each have the curve surface.

13. The camera unit according to claim 11, wherein
the camera holding section is arranged with a second engaging section,
the camera body is arranged with a first engaging section configured to regulate a rotation of the camera body around the rotation centerline in a state where the first engaging section is engaged with the second engaging section of the camera holding section, and
the first engaging section of the camera body is opposed to the second engaging section of the camera holding section in the left-right direction.

14. The camera unit according to claim 11, wherein
the camera body has, on the outside surface thereof, a projecting section shifted upward relative to a center in an up-down direction of the camera body, and
the stand has a stopper that is caught by the projecting section of the camera body if an attitude of the camera body is reverse in the up-down direction.

* * * * *